(12) United States Patent
Tseng

(10) Patent No.: US 11,906,788 B2
(45) Date of Patent: Feb. 20, 2024

(54) OPTICAL CONNECTOR

(71) Applicant: Chung-Ming Tseng, Myau-Li County (TW)

(72) Inventor: Chung-Ming Tseng, Myau-Li County (TW)

(73) Assignee: ACSUPER TECHNOLOGIES INC., Myau-Li County (TW)

( * ) Notice: Subject to any disclaimer, the term of this patent is extended or adjusted under 35 U.S.C. 154(b) by 0 days.

(21) Appl. No.: 17/557,066

(22) Filed: Dec. 21, 2021

(65) Prior Publication Data
US 2022/0221654 A1 Jul. 14, 2022

(30) Foreign Application Priority Data

Jan. 14, 2021 (TW) .................. 110101410

(51) Int. Cl.
*G02B 6/38* (2006.01)
(52) U.S. Cl.
CPC ......... *G02B 6/3825* (2013.01); *G02B 6/3821* (2013.01); *G02B 6/3874* (2013.01); *G02B 6/3897* (2013.01)

(58) Field of Classification Search
CPC ............................ G02B 3/3821; G02B 6/3874
See application file for complete search history.

(56) References Cited

U.S. PATENT DOCUMENTS 4,696,538 A * 9/1987 Despouys ............ G02B 6/3843
385/139

FOREIGN PATENT DOCUMENTS

CN 105676372 A * 6/2016
WO WO-9415232 A1 * 7/1994 ........... G02B 6/3812

* cited by examiner

*Primary Examiner* — Sung H Pak

(57) ABSTRACT

The present invention provides an optical connector comprising an optical receptacle, a coupling terminal, and a coil structure, wherein the optical receptacle has an accommodation space and a positioning structure, the coupling terminal is arranged into the accommodation space, and the coil structure has a first fixing coil and an elastic coil wherein the coupling terminal is inserted into the elastic coil and the first fixing coil is arranged onto the positioning structure.

8 Claims, 13 Drawing Sheets

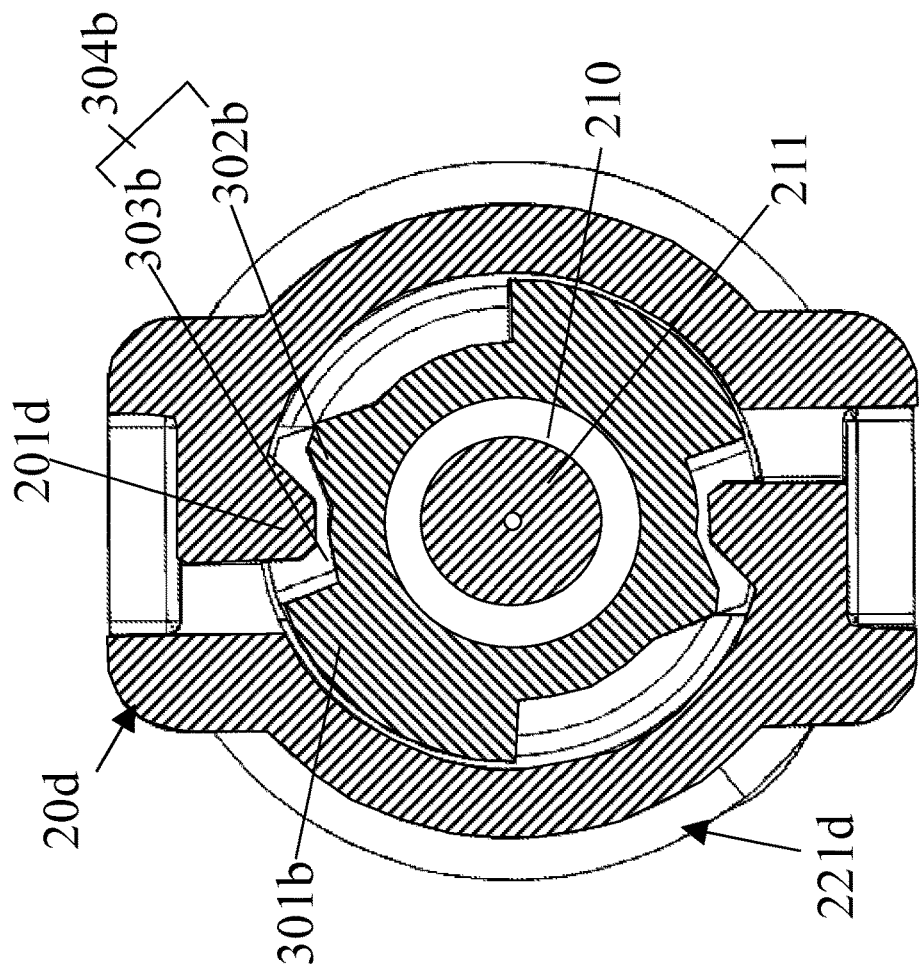
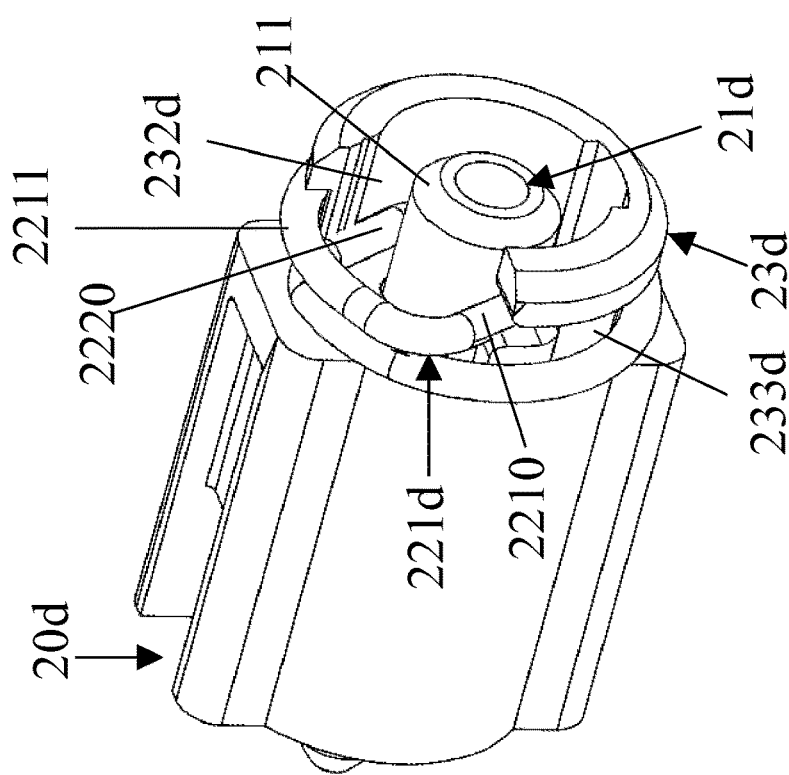
FIG. 6C
FIG. 6B

OPTICAL CONNECTOR

CROSS-REFERENCE TO RELATED APPLICATION

This application claims the benefit of Taiwan Patent Application No. 110101410, filed on Jan. 14, 2021, in the Taiwan Intellectual Property Office of the R.O.C, the disclosure of which is incorporated herein in its entirety by reference.

FIELD OF INVENTION

The present invention relates to an optical connector. In particular, it relates to an optical connector having a coil structure with an elastic coil and a fixing coil to position a coupling terminal to produce shift in the radial direction.

BACKGROUND OF THE INVENTION

Due to the advantages of high frequency bandwidth and low loss, optical fibers have been widely used as signal transmission media in recent years. The use of optical fiber has already had a major revolutionary impact in the communications industry. Nowadays, 100G optical module communication is not enough, and the future will be expected to move towards the era of 400G optical module communications.

In the field of 400G optical communications, there are also many designs for the packaging design of optical fiber modules, one of which is called Quad Small Form Factor Pluggable-Double Density (QSFF-DD). The specification, with a downward compatible design, has attracted the attention of many large manufacturers, and has launched corresponding specifications of optical communication module products.

FIG. 1 is a schematic diagram of a conventional optical connector. The optical connector in FIG. 1 is an LC optical connector. In the prior art, an elastic coil 10 is disposed in the inner space of the optical connector 1, one end of the elastic coil 10 is leaned against the end surface of the inner housing 11 of the optical connector 1, and another end is sleeved into the end of the coupling terminal 12, and leaned against the end surface 13 on the coupling terminal 12. In the prior art, the entire elastic coil 10 is used as an elastic structure, except for the end being leaned against the inner end surface of the optical connector 1, and is used to extend or compress to adjust the position of the coupling terminal 12 in the axial direction. In the prior art, because the end of the elastic coil 1 is leaned against the end surface of the internal structure of the optical connector 1, although it has the positioning effect in the axial direction, there is no proper fixing mechanism in the radial direction perpendicular to the axial direction. In the prior art, because the end of the elastic coil 1 is leaned against the end surface of the internal structure of the optical connector 1, although it has the positioning effect in the axial direction, there is no proper fixing mechanism in the radial direction perpendicular to the axial direction. As a result, the coupling terminal 12 of the optical connector 1 is prone to lateral displacement due to lateral or radial force when it is coupled to the optical receptacle, thereby affecting the electrical connection effect. In addition, the conventional LC optical connector 1 also has the problem that the length L of the connector body is too long, which limits its application.

In summary, it's necessary for an optical connector to solve the problem of conventional optical connectors.

The above information disclosed in this section is only for enhancement of understanding of the background of the described technology and therefore it may contain information that does not form the prior art that is already known to a person of ordinary skill in the art.

SUMMARY OF THE INVENTION

The present invention provides an optical connector, which utilizes elastic elements for fixing the position of the optical connector in the axial and radial directions, so as to prevent the optical connector from a lateral or radial force to cause the displacement of the coupling terminal when the optical connector is inserted into the optical receptacle. The present invention stabilizes the position of the coupling terminal of the optical connector to ensure the effect of signal connection.

The present invention provides an optical connector. The coil structure achieves the effect of fixing the elastic coil through a positioning structure arranged inside or outside the housing and integrally formed with the housing. Therefore, it's not necessary to provide an additional supporting structure for the stop coil structure, thereby shortening the length of the housing, to achieve the effect of saving space.

The present invention provides an optical connector, comprising: a housing, having a positioning structure, an accommodation space disposed into the housing; a coupling terminal, disposed into the accommodation space; and a coil structure, having an elastic coil and a first fixing coil, the elastic coil sleeved on the coupling terminal, and the first fixing coil sleeved on the positioning structure.

In one embodiment, the positioning structure is disposed into the accommodation space, and has an accommodation groove and a plurality of leaning structures, the accommodation groove is disposed on a wall surface of the accommodation space, the plurality of leaning structures are connected to a wall surface of the housing and correspond to the accommodation groove, and the first fixing coil is disposed into the accommodation groove and restrained by the plurality of leaning structures.

In another embodiment, the positioning structure is disposed on an end of the housing, and has an accommodation groove and a leaning structure connected to a side of the accommodation groove, the first fixing coil is disposed into the accommodation groove, and an end section of the first fixing coil is leaned against the positioning structure.

Many of the attendant features and advantages of the present invention will become better understood with reference to the following detailed description considered in connection with the accompanying drawings.

BRIEF DESCRIPTION OF THE DRAWINGS

The detailed structure, operating principle and effects of the present invention will now be described in more details hereinafter with reference to the accompanying drawings that show various embodiments of the present invention as follows.

FIG. 6B is a three-dimensional schematic diagram of the optical connector of FIG. 6A from different viewing angles.

FIG. 6C is a schematic partial cross-sectional view of the coupling position between the optical connector and the optical receptacle of the present invention.

DETAILED DESCRIPTION OF THE PREFERRED EMBODIMENTS

Figure 1:
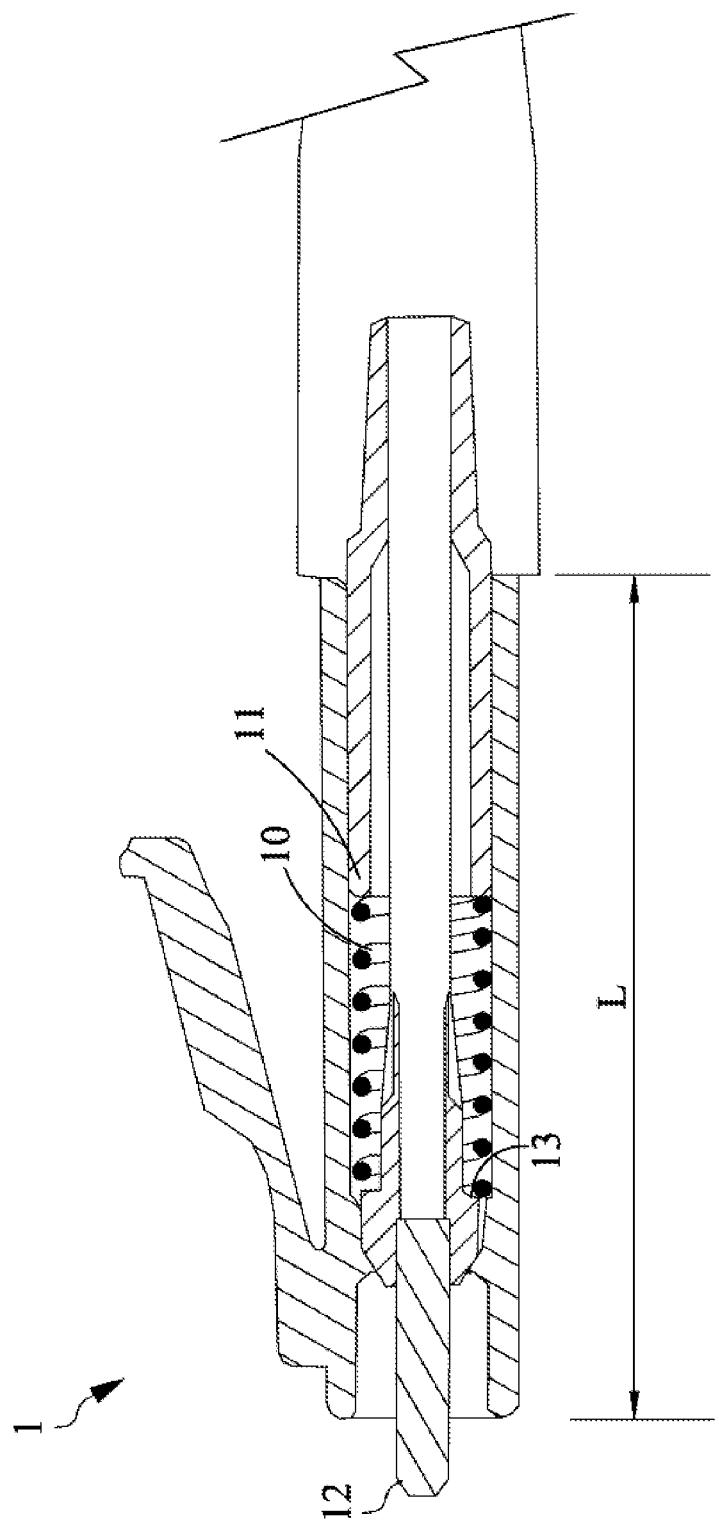
FIG. 1 is a schematic diagram of a conventional optical connector.

Reference will now be made in detail to the exemplary embodiments of the present invention, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this invention will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way.

For convenience, certain terms employed in the specification, examples and appended claims are collected here. Unless defined otherwise, all technical and scientific terms used herein have the same meaning as commonly understood by one of the ordinary skill in the art to which this invention belongs.

Various embodiments will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments.

The singular forms "a", "and", and "the" are used herein to include plural referents unless the context clearly dictates otherwise.

The following descriptions are provided to elucidate a latch structure and optical receptacle thereof and to aid it of skilled in the art in practicing this invention. These embodiments are merely exemplary embodiments and in no way to be considered to limit the scope of the invention in any manner.

Figure 2A:
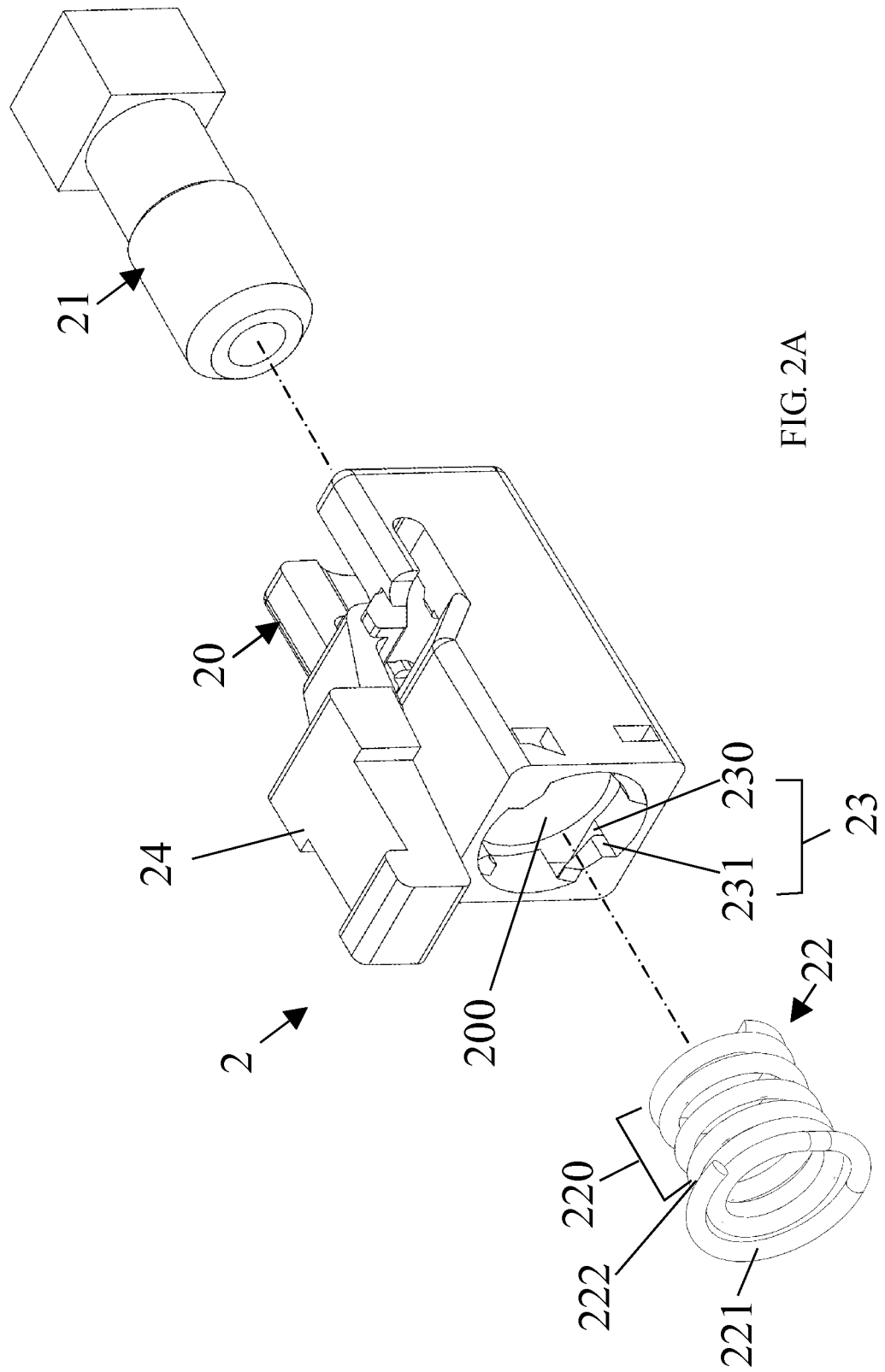
FIG. 2A is a three-dimensional diagram of an embodiment of the optical connector of the present invention.
Figure 2C:
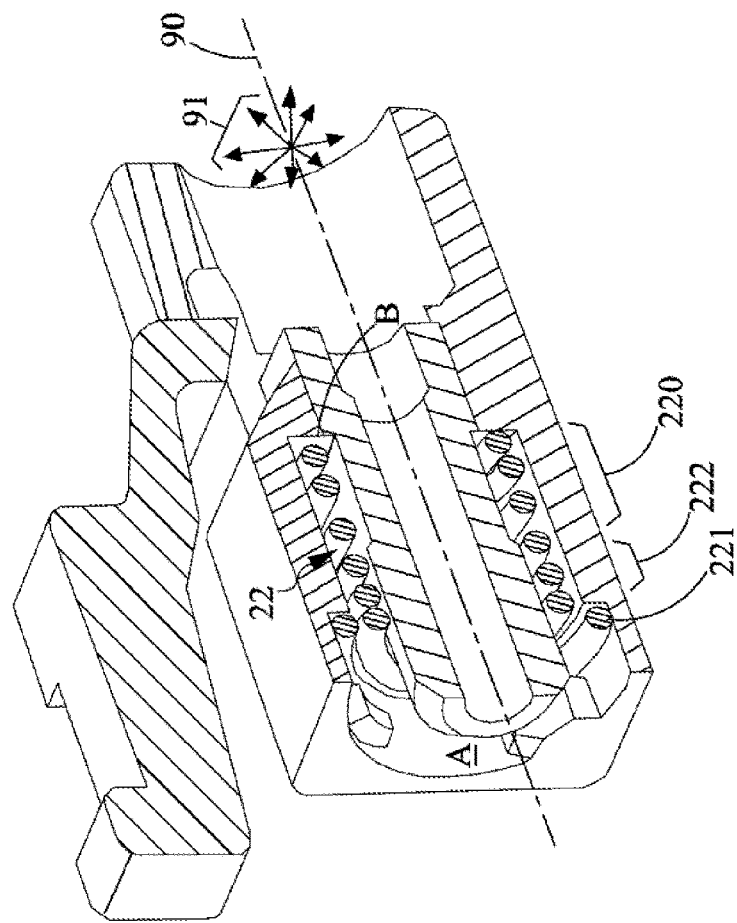
FIG. 2C is a schematic cross-sectional view of the optical connector of FIG. 2A.
Figure 2B:
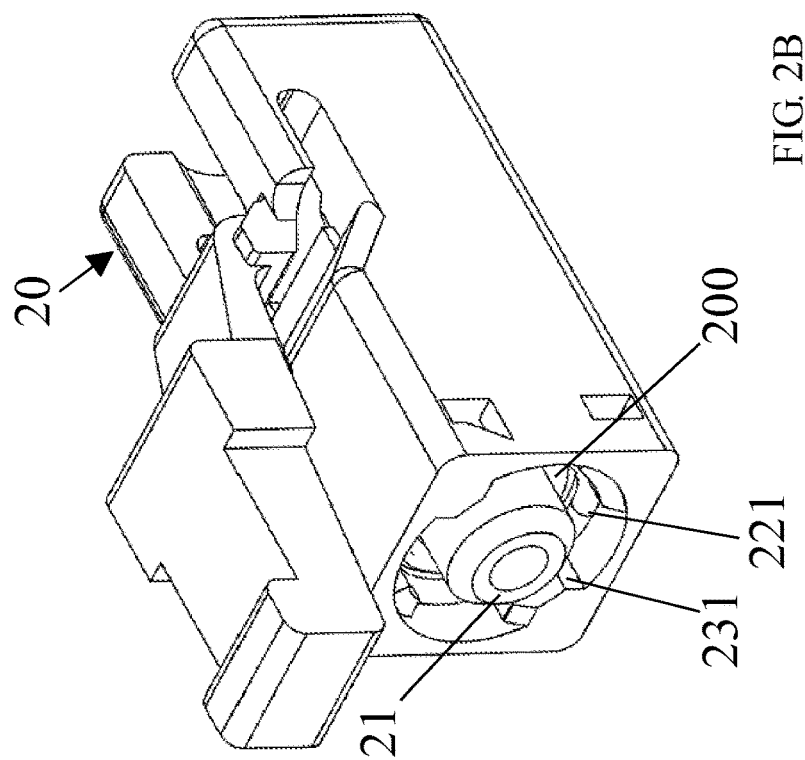
FIG. 2B is an exploded schematic diagram of the optical connector of FIG. 2A.

Please refer to FIGS. 2A to 2C, in which FIG. 2A is a three-dimensional diagram of an embodiment of the optical connector of the present invention, FIG. 2B is an exploded schematic diagram of the optical connector of FIG. 2A, and FIG. 2C is a schematic cross-sectional view of the optical connector of FIG. 2A. In this embodiment, the optical connector 2 includes a housing 20, a coupling terminal 21 and a coil structure 22. The housing 20 has a positioning structure 23 and a pressing rod 24, and the housing 20 has an accommodation space 200. In this embodiment, the pressing rod 24 located on an outer surface of the housing 20 is used for releasing the coupling state between the optical connector 2 and the connector receptacle, which belongs to the conventional technology and would not be repeated here. In addition, the positioning structure 23 is disposed on the first side A of the accommodation space 200. The positioning structure 23 further has an accommodation groove 230 and a plurality of leaning structures 231. The accommodation groove 230 is disposed on the wall surface of the accommodation space 200, and the plurality of leaning structures 231 are connected to the inner wall surface of the housing 20 and located on a side of the accommodation groove 230 for restraining the coil structure 22 fixed into the accommodation groove 230.

The coupling terminal 21 is disposed into the accommodation space 200. The coil structure 22 has an elastic coil 220 and a first fixing coil 221. In this embodiment, the outer diameter of the first fixing coil 221 is larger than the outer diameter of the elastic coil 220. The elastic coil 220 is sleeved on the coupling terminal 21, and the elastic coil 220 has a plurality of coils to generate elastic compression and stretching effects. The outermost coil of the elastic coil 220 is leaned against the wall surface of the second side B of the accommodation space 200. The first fixing coil 221 is sleeved on the positioning structure 23. In this embodiment, one coil of the first fixing coil 221 is accommodated into the accommodation groove 230 and is restrained by the plurality of leaning structures 231. It should be noted that, in this embodiment, a second fixing coil 222 is further connected between the elastic coil 220 and the first fixing coil 221, and sleeved on the coupling terminal 21. In this embodiment, the first fixing coil 221 and the second fixing coil 222 do not have a compression or stretching spring effect. Moreover, the first fixing coil 221 is a space of the fixing coil structure 22 in the axial direction 90, the coil structure 22 is avoided being shifted or separated from the housing 20 by the positioning structure 23 in the axial direction 90 and the radial direction 91, and the second fixing coil 222 is used to fix the coupling terminal 21 to prevent lateral or radial displacement of the coupling terminal 21.

Next, the working principle of the coil structure 22 of this embodiment would be explained. Since the positioning structure 23 restrains the first fixing coil 221, it may be ensured that when the elastic coil 220 in the coil structure 22 can be stretched and compressed in the central axis 90 of the optical connector 2, the coil structure 22 would not be separated from the housing 20. In addition, the second fixing coil 222 is extended and sleeved on the periphery of the coupling terminal 21 by the first fixing coil 221 and does not have the effect of compression or stretching. Therefore, when the coupling terminal 21 is coupled with the optical receptacle, the shift of the coil structure 22 due to the lateral or radial force 91 (shown in FIG. 2C) may be avoided, the stability of coupling terminal 21 may be maintained, and the position of the coupling terminal 21 of the optical connector 2 in the axial direction 90 may be stabilized to ensure the effect of signal connection.

Figure 3B:
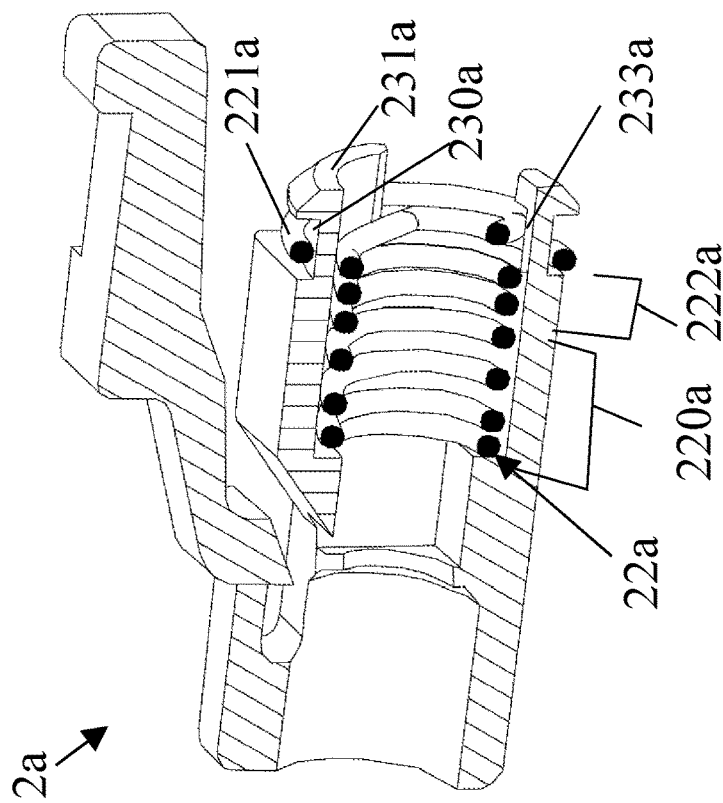
FIG. 3B is a schematic cross-sectional view of the optical connector shown in FIG. 3A.
Figure 3A:
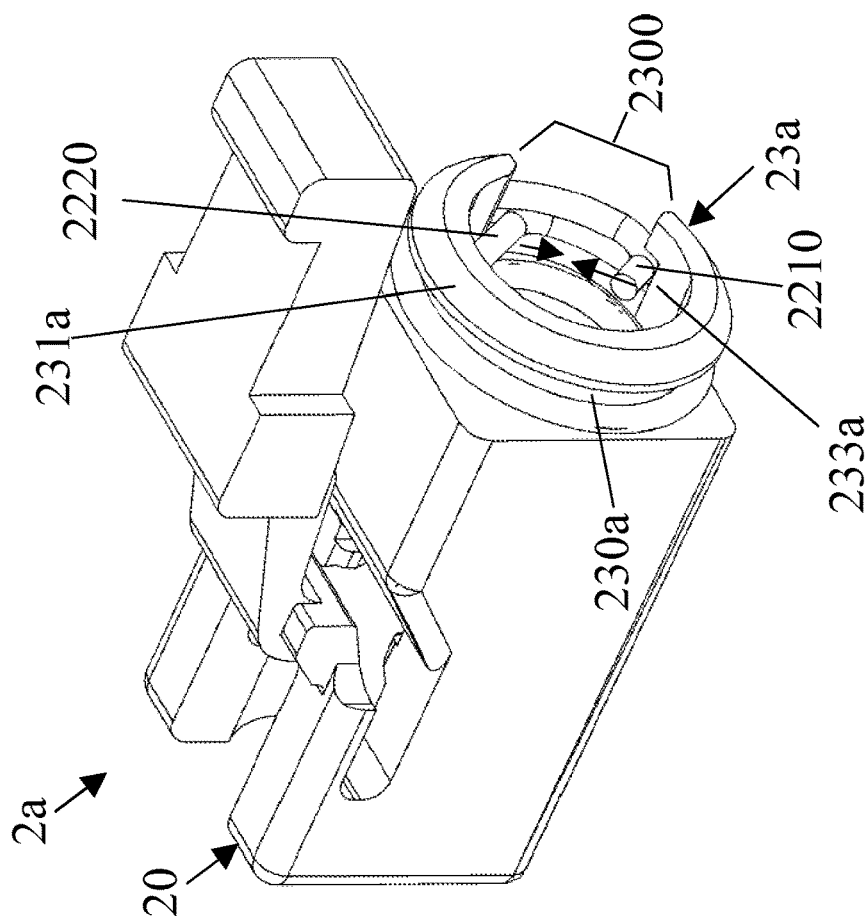
FIG. 3A is a three-dimensional diagram of another embodiment of the optical connector of the present invention.
Figure 3D:
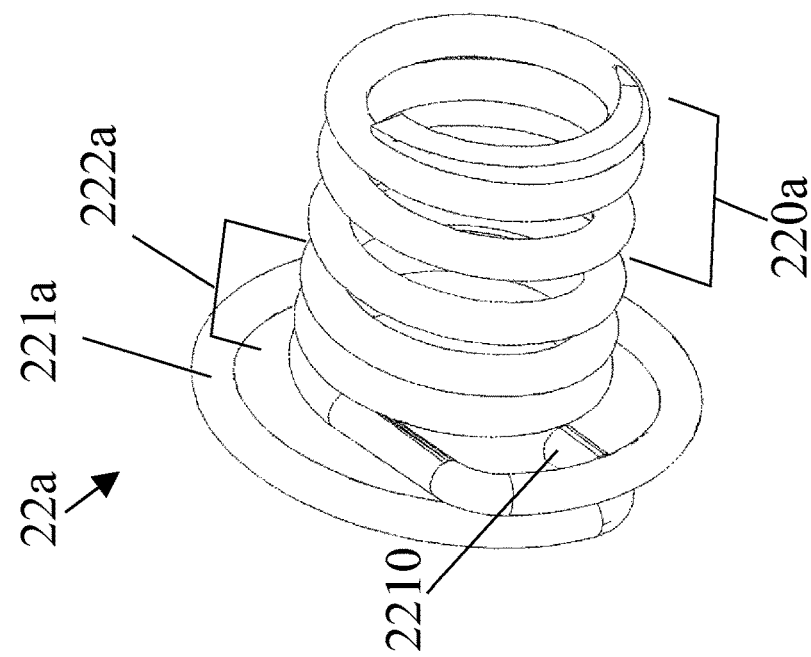
FIG. 3D is a three-dimensional schematic diagram of the coil structure in the optical connector of FIG. 3A.
Figure 3C:
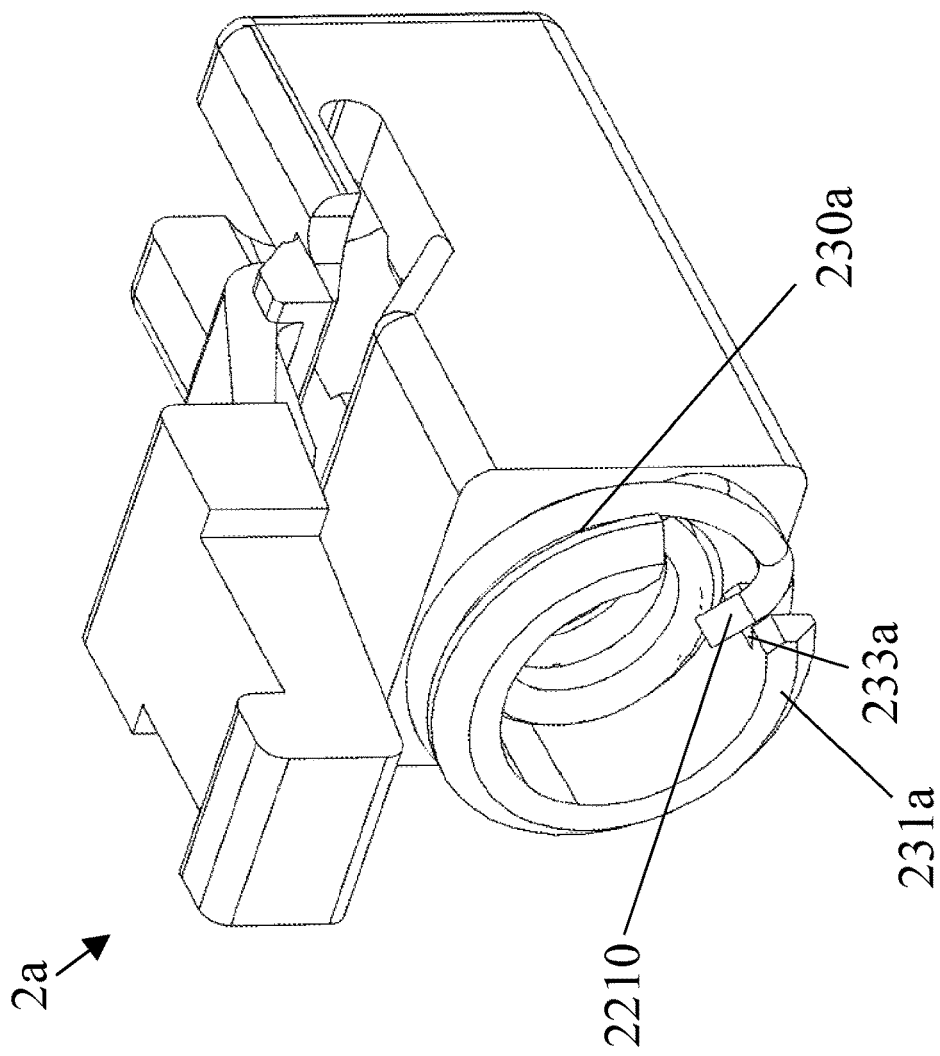
FIG. 3C is a schematic diagram of connecting the first fixing coil and the housing.

Please refer to FIGS. 3A to 3D, in which FIG. 3A is a three-dimensional diagram of another embodiment of the optical connector, FIG. 3A is a schematic cross-sectional view of the optical connector shown in FIG. 3A, FIG. 3C is a schematic diagram of connecting the first fixing coil and the housing, and FIG. 3D is a three-dimensional schematic diagram of the coil structure in the optical connector of FIG. 3A. Basically, the optical connector 2a is similar to the aforementioned optical connector 2. The difference is that the positioning structure 23a in this embodiment is disposed on the outer wall surface of the housing 20, and the positioning structure 23a further has an accommodation groove 230a and a leaning structure 231a. The leaning structure 231a is disposed on one side of the accommodation groove 230a, and the leaning structure 231a has an opening 2300 extending toward the accommodation groove 230a. The first fixing coil 221a of the coil structure 22a is located in the accommodation groove 230a, and the end section 2210 of the first fixing coil 221a is bent at a predetermined angle for leaning against the positioning structure 23a. In this embodiment, the positioning structure 23a further has a positioning groove 233a, which is formed at a side of the opening 2300, on the wall surface of the accommodation groove 230a, and leaned against the end section 2210. A second fixing coil 222a is further connected between the elastic coil 220a and the first fixing coil 221a, and is sleeved on the coupling terminal 21. In this embodiment, the outer diameter of the second fixing coil 222a is equal to the outer diameter of the elastic coil 220a, and is smaller than the outer diameter of the first fixing coil 221a.

When assembling the coil structure 22a, as shown in FIGS. 3A and 3B, the end section 2210 of the first fixing coil 221a and the extending section 2220 of the second fixing coil 222a are compressed toward the central axis of the optical connector 2a to allow the first fixing coil 221a expand to fit into the accommodation groove 230a of the positioning structure 23a, the end section 2210 is leaned against the leaning structure 231a by the elastic pressure, and the positioning effect is generated by an interaction force between the end section 2210 and the positioning groove 233a. In this embodiment, since the accommodation groove 230a restrains the first fixing coil 221a, it may be ensured that when the elastic coil 220a in the coil structure 22a is stretched and compressed along the central axis 90 of the optical connector 2a, the coil structure 22a is not separated from the housing. In addition, an end of the coupling terminal 21 would be located between the end section 2210 and the extending section 2220, and the second fixing coil 222a extended by the first fixing coil 221a is sleeved on the periphery of the coupling terminal 21. Therefore, when the coupling terminal 21 is coupled to the optical receptacle, the shift of the coil structure 22a due to the lateral or radial force may be avoided, the stability of the coupling terminal 21 is maintained, and the position of the coupling terminal 21 of the optical connector 2 may be stabilized to ensure the effect of signal connection.

Figure 4A:
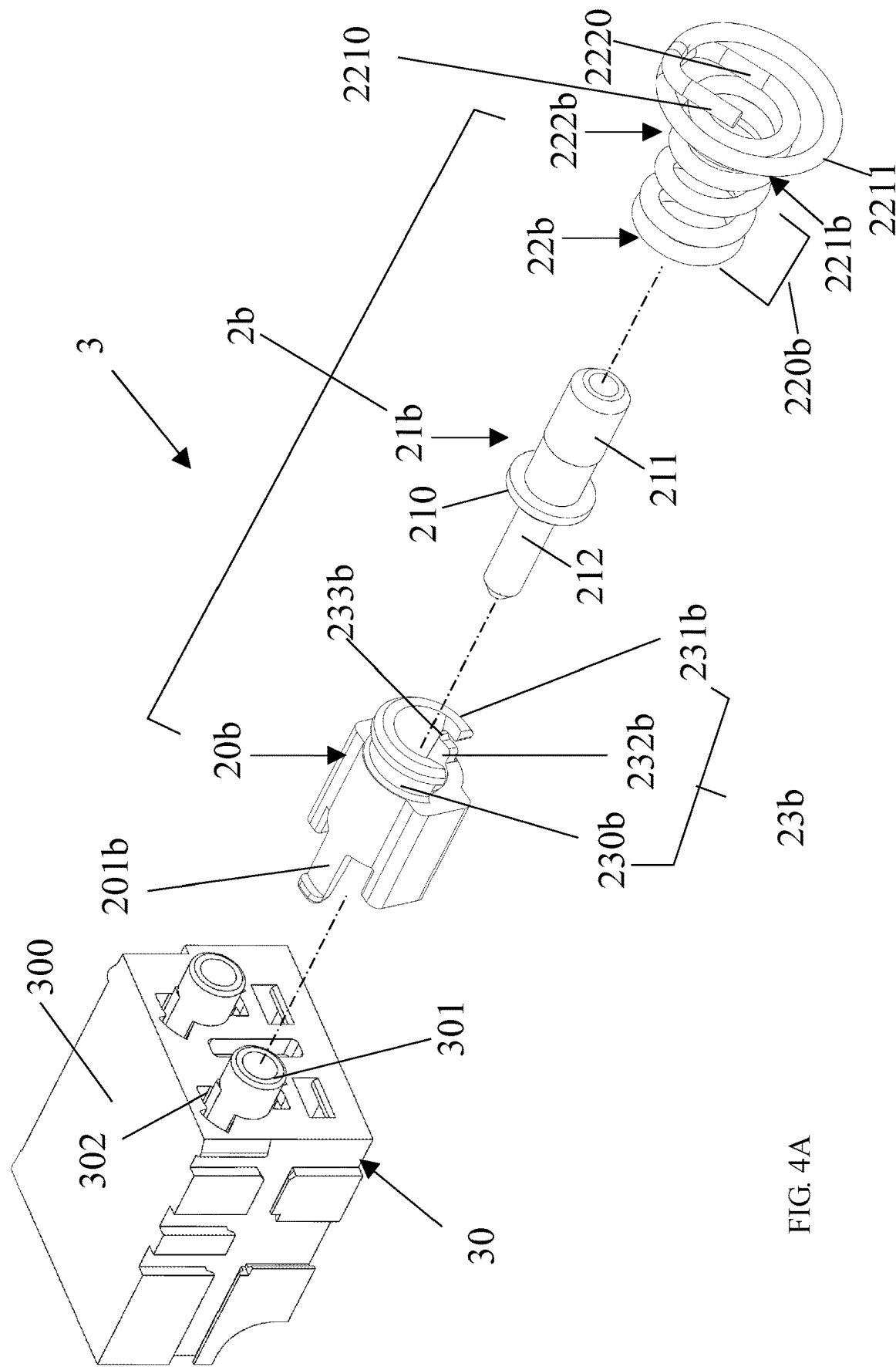
FIG. 4A is a three-dimensional exploded schematic view of an embodiment of the optical connector module.
Figure 4B:
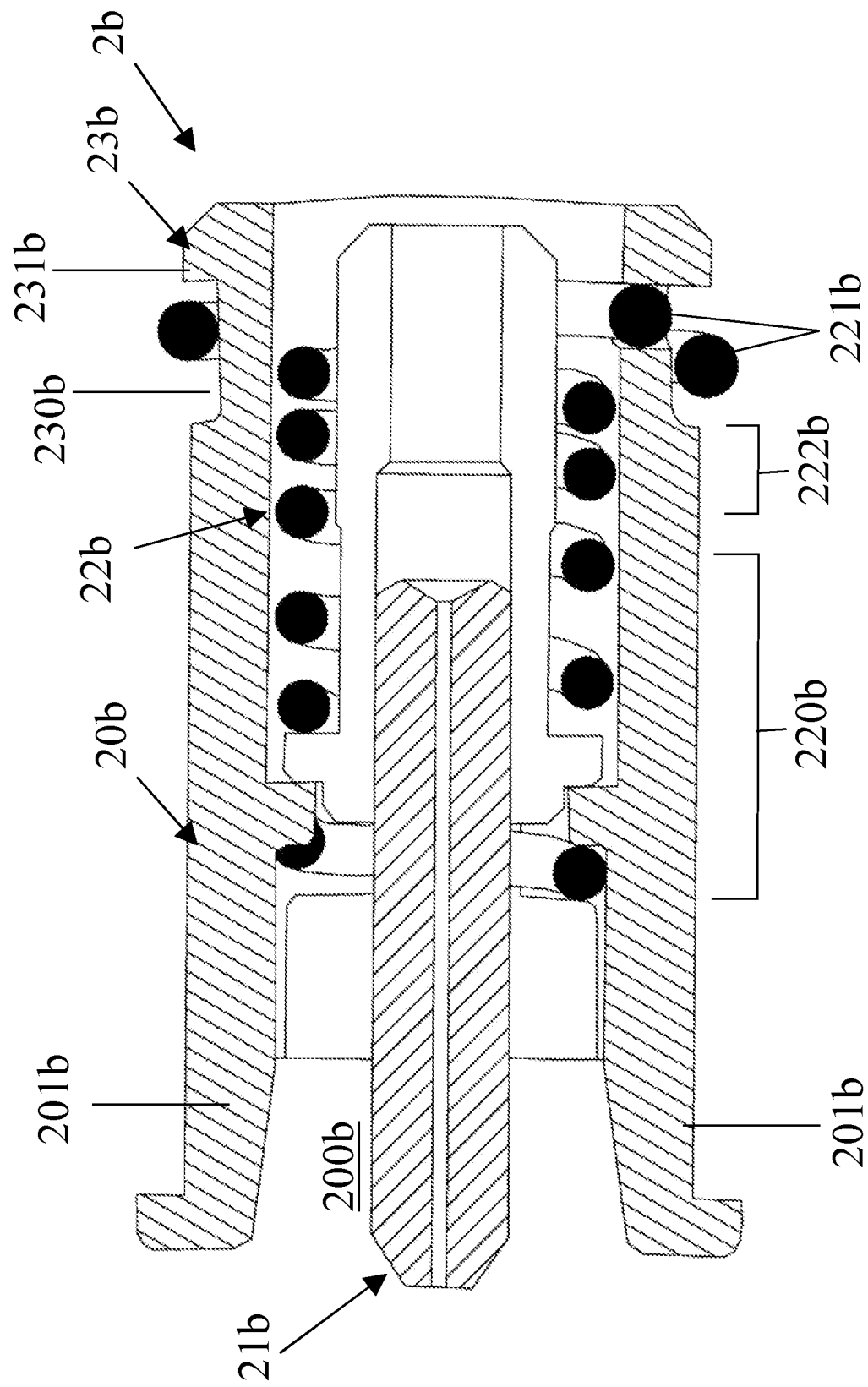
FIG. 4B is a schematic cross-sectional view of an embodiment of an optical connector of the present invention.
Figure 4C:
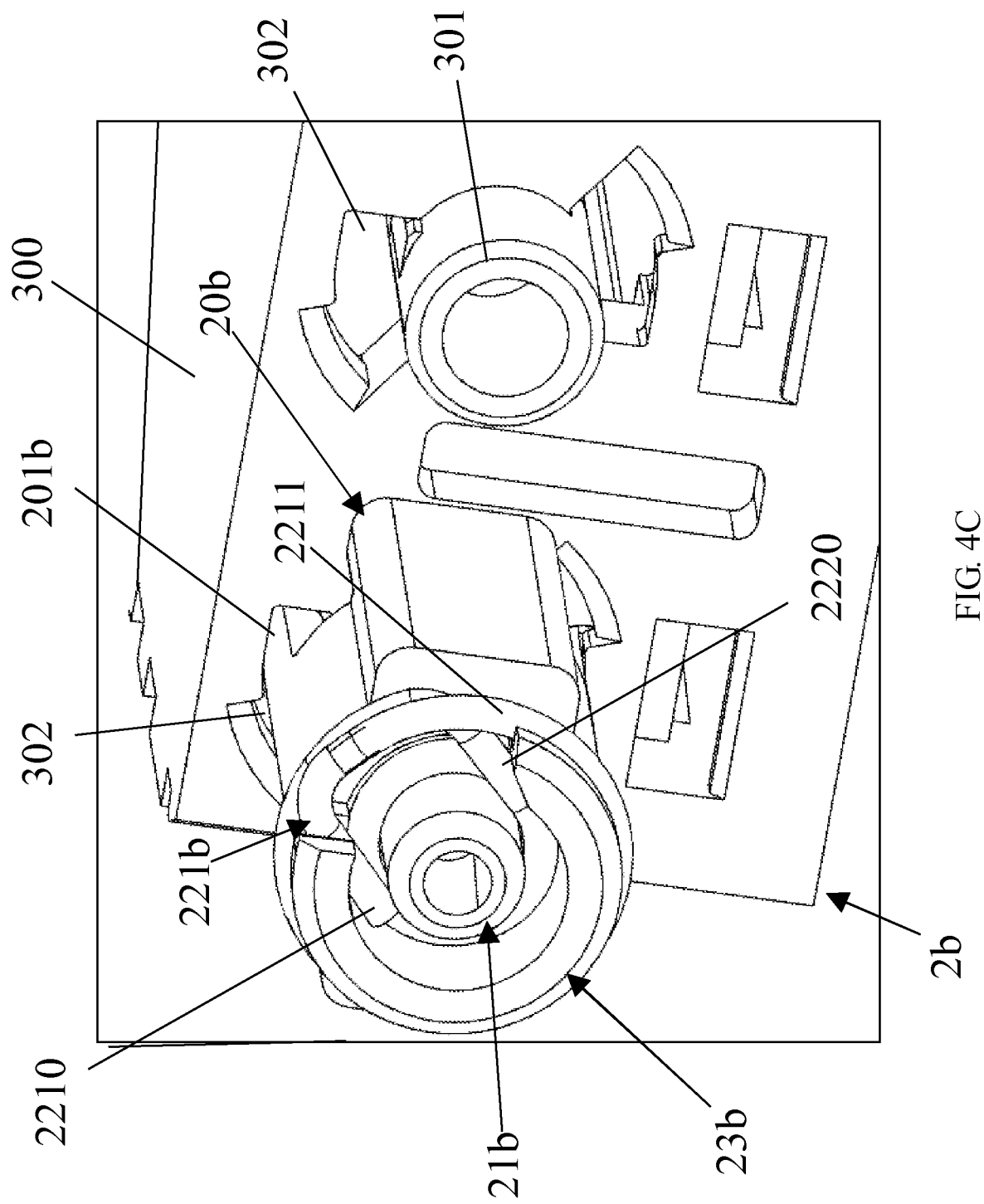
FIG. 4C is a schematic diagram of coupling the optical connector and the optical receptacle.

Please refer to FIGS. 4A to 4C, in which FIG. 4A is a three-dimensional exploded schematic view of an embodiment of the optical connector module, FIG. 4B is a schematic cross-sectional view of an embodiment of an optical connector, and FIG. 4C is a schematic diagram of coupling the optical connector and the optical receptacle. In this embodiment, the optical connector module 3 includes an optical receptacle 30 and an optical connector 2b. The optical receptacle 30 is the receptacle of the LC optical connector, but is not limited herein. The optical receptacle 30 includes a receptacle body 300 and a plurality of coupling terminals 301, which are respectively coupled to the optical connector 2b. Two sides of each coupling terminal 301 have buckle grooves 302.

The optical connector 2b in this embodiment includes a housing 20b, a coupling terminal 21b, and a coil structure 22b. The housing 20b has an accommodation space 200b for accommodating the coupling terminal 21b and a part of the coil structure 22b. In this embodiment, a buckle arm 201b is extended from the housing 20b. In this embodiment, the buckle arms 201b are arranged in pairs. In addition, a positioning structure 23b is disposed at an end of the housing 20b. In this embodiment, the positioning structure 23b further has an accommodation groove 230b and a leaning structure 231b, wherein the leaning structure 231b is disposed on the periphery of the accommodation groove 230b, and an opening 232b is disposed in a predetermined area of the leaning structure 231b. A positioning groove 233b is arranged on a side wall of the opening 232b.

The coupling terminal 21b is accommodated in the accommodation space 200b of the housing 20b for coupling with one of the coupling terminals 301 on the optical receptacle 30. The coil structure 22b has an elastic coil 220b, a first fixing coil 221b, and a second fixing coil 222b. The outer diameter of the second fixing coil 222b is equal to the outer diameter of the elastic coil 220b and smaller than the outer diameter of the first fixing coil 221b. The second fixing coil 222b further has an extending section 2220, which is extended from the accommodation space 200b to the opening 232b of the accommodation groove 230b, is connected to the winding section 2211 of the first fixing coil 221b, and is wound around the accommodation groove 230b. Another end of the winding section 2211 is connected to the end section 2210, and the end section 2210 extends toward the side wall of the opening 232b and is leaned against the positioning structure 23b. In this embodiment, the positioning structure 23b further has a positioning groove 233b formed on the accommodation groove 230b and on a side of the opening 232b. Because the end section 2210 is bent at a predetermined angle by the first fixing coil 221b and leaned against the positioning groove 233b of the side wall of the opening 232b, the winding section 2211 and the end section 2210 are respectively clamped on the periphery of the first terminal portion 211 of the coupling terminal 21b to produce the effect of fixing the coupling terminal 21b.

When assembling the coil structure 22b, an end of the elastic coil 220b is clamped against the stopping wall 210 on the coupling terminal 21b, and the entire coil structure 22b and the coupling terminal 21b are inserted into the accommodation space 200b of the housing 20b. After that, the first fixing coil 221b is sleeved into the accommodation groove 230b of the positioning structure 23b, and the end section 2210 is slightly internally pressed and clamped on the positioning groove 233b of the leaning structure 231b. The positioning effect is produced by the force between the end section 2210 and the leaning structure 231b. After that, the optical connector 2b is coupled to the coupling terminal 301 of the optical receptacle 30, and the buckle arm 201b of the optical connector 2b is inserted into the buckle groove 302 during coupling, so that the second terminal portion 212 of the coupling terminal 21b is coupled with the coupling terminal 301 of the optical receptacle 30. Eventually, the housing 20b is rotated clockwise in a predetermined angle to fix the optical connector 2b on the optical receptacle 30.

Since the accommodation groove 230b and the leaning structure 231b restrain the first fixing coil 221b, it can be ensured that when the elastic coil 220b in the coil structure 22b is stretched and compressed along the central axis of the optical connector 2b, the coil structure 22b is not separated from the housing. In addition, since the second fixing coil 222b is extended from the first fixing coil 221b and arranged in the accommodation space 200b, the periphery of the first terminal portion 211 of the coupling terminal 21b would be restrained by the second fixing coil 222b. The second fixing coil 222b does not have compression or stretching effect. Therefore, when the coupling terminal 21b is coupled with the optical receptacle 30, the shift of the coil structure 22b due to the lateral or radial force may be avoided, the stability of coupling terminal 21b may be maintained, and the position of the coupling terminal 21b of the optical connector 2b may be stabilized to ensure the effect of signal connection.

Figure 5A:
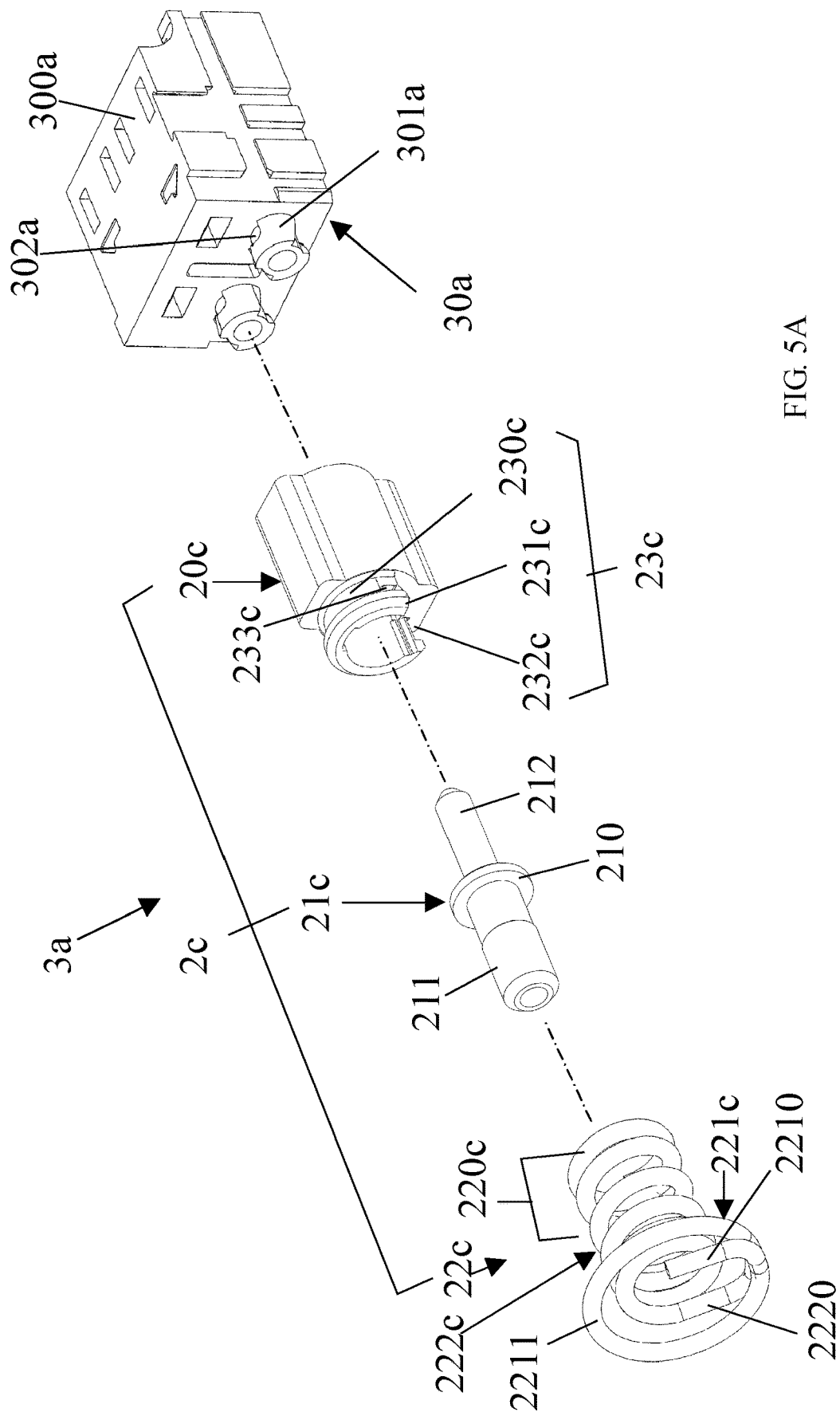
FIG. 5A is an exploded schematic diagram of another embodiment of the optical connector module in the present invention.
Figure 5B:
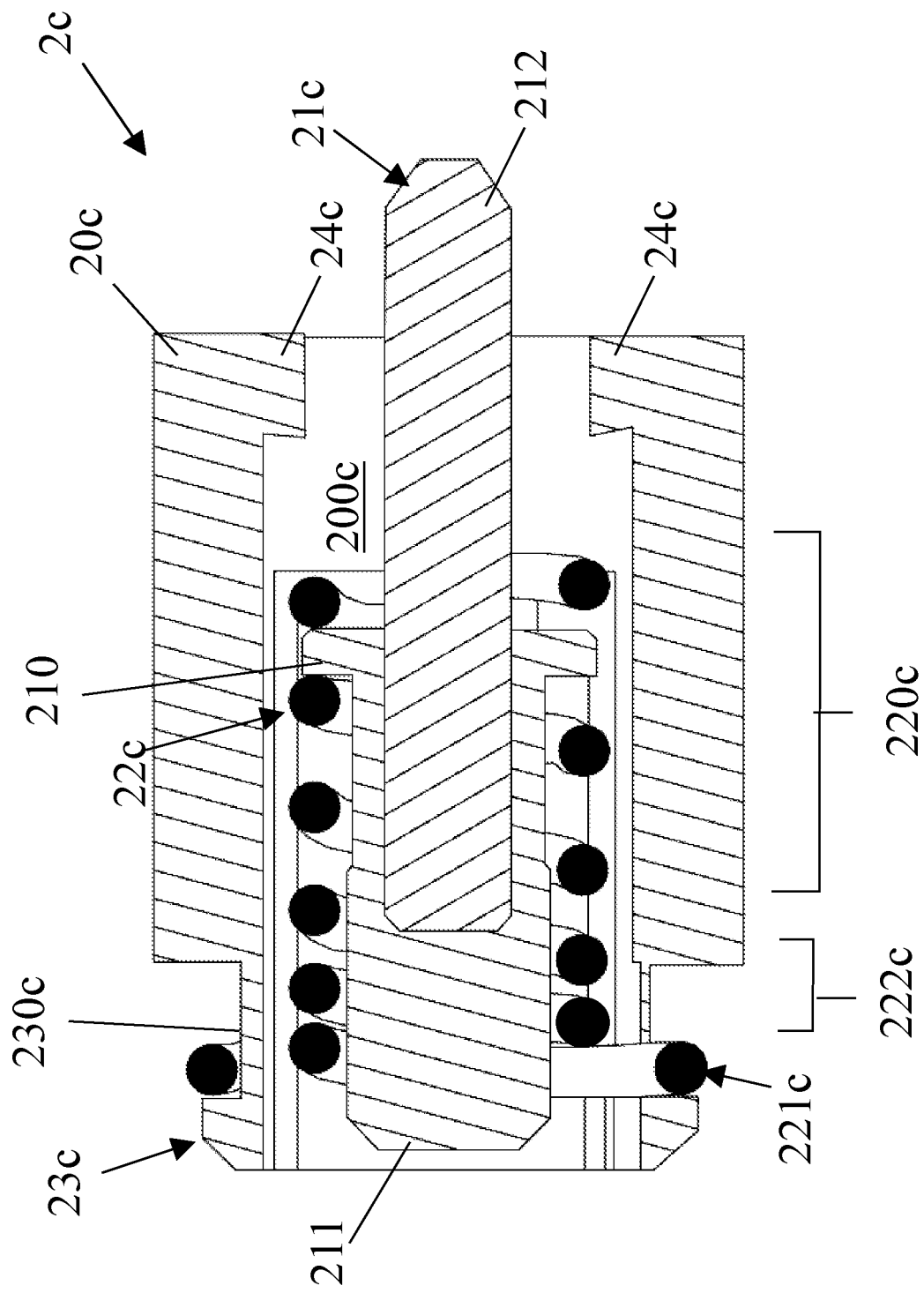
FIG. 5B is a schematic cross-sectional view of another embodiment of the optical connector in the present invention.

Please refer to FIGS. 5A and 5B, in which FIG. 5A is an exploded schematic diagram of another embodiment of the optical connector module, FIG. 5B is a schematic cross-sectional view of another embodiment of the optical connector. In this embodiment, the optical connector module 3a includes an optical receptacle 30a and an optical connector 2c. The optical receptacle 30a is the receptacle of the LC optical connector, but is not limited herein. The optical receptacle 30a includes a receptacle body 300a and a plurality of coupling terminals 301a, which are respectively coupled to the optical connector 2c. Each coupling terminal 301a has a buckle groove 302.

In this embodiment, the optical connector 2c includes a housing 20c, a coupling terminal 21c, and a coil structure 22c. The housing 20c has an accommodation space 200c for accommodating the coupling terminal 21c and a part of the coil structure 22c. In this embodiment, a buckle block 24c is disposed on the wall surface of the accommodation space 200c of the housing 20c. In this embodiment, the buckle blocks 24c are arranged in pairs. In addition, a positioning structure 23c is disposed at an end of the housing 20c. In this embodiment, the positioning structure 23c further has an accommodation groove 230c and a leaning structure 231c, wherein the leaning structure 231c is disposed on the periphery of the accommodation groove 230c, and an opening 232c is disposed in a predetermined area of the leaning structure 231c. A positioning groove 233c is arranged on a side wall of the opening 232c.

The coupling terminal 21c is accommodated in the accommodation space 200c of the housing 20c for coupling with one of the coupling terminals 301a on the optical receptacle 30a. The coil structure 22c has an elastic coil 220c, a first fixing coil 221c, and a second fixing coil 222c. The outer diameter of the second fixing coil 222c is equal to the outer diameter of the elastic coil 220c and smaller than the outer diameter of the first fixing coil 221c. The second fixing coil 222c further has an extending section 2220, which is extended from the accommodation space 200c to the opening 232c of the accommodation groove 230c, is connected to the winding section 2211 of the first fixing coil 221c, and is wound around the accommodation groove 230c. Another end of the winding section 2211 is connected to the end section 2210, and the end section 2210 extends toward the side wall of the opening 232c and is leaned against the positioning structure 23c. In this embodiment, the positioning structure 23c further has a positioning groove 233c formed on the accommodation groove 230c and on a side of the opening 232c. Because the end section 2210 is bent in a predetermined angle by the first fixing coil 221c and leaned against the positioning groove 233c on the side wall of the opening 232c, the winding section 2211 and the end section 2210 are respectively clamped on the periphery of the first terminal portion 211 of the coupling terminal 21c to produce the effect of fixing the coupling terminal 21c.

When assembling the coil structure 22c, an end of the elastic coil 220c is clamped against the stopping wall 210 of the coupling terminal 21c, and the entire coil structure 22c and the coupling terminal 21c are inserted into the accommodation space 200c of the housing 20c. After that, the first fixing coil 221c is sleeved into the accommodation groove 230c of the positioning structure 23c, and the end section 2210 is slightly internally pressed and clamped on the positioning groove 233c of the leaning structure 231c. The positioning effect is produced by the force between the end section 2210 and the leaning structure 231c. After that, the optical connector 2b is coupled to the coupling terminal 301a of the optical receptacle 30a, and the buckle block 24c of the optical connector 2b is inserted into the buckle groove 302 during coupling, so that the second terminal portion 212 of the coupling terminal 21c is coupled with the coupling terminal 301a of the optical receptacle 30a. Eventually, the housing 20c is rotated clockwise in a predetermined angle to make the buckle arm 24c engage with the buckle groove 302a, so that the optical connector 2c is fixed on the optical receptacle 30a.

Since the accommodation groove 230c and the leaning structure 231c restrain the first fixing coil 221c, it may be ensured that when the elastic coil 220c in the coil structure 22c is stretched and compressed along the central axis of the optical connector 2c, the coil structure 22c is not separated from the housing. In addition, since the second fixing coil 222c is extended from the first fixing coil 221c and arranged in the accommodation space 200c, the periphery of the first terminal portion 211 of the coupling terminal 21c would be restrained by the second fixing coil 222c. The second fixing coil 222c does not have compression or stretching effect. Therefore, when the coupling terminal 21c is coupled with the optical receptacle 30a, the shift of the coil structure 22b due to the lateral or radial force may be avoided, the stability of coupling terminal 21b may be maintained, and the position of the coupling terminal 21c of the optical connector 2c may be stabilized to ensure the effect of signal connection.

Figure 6A:
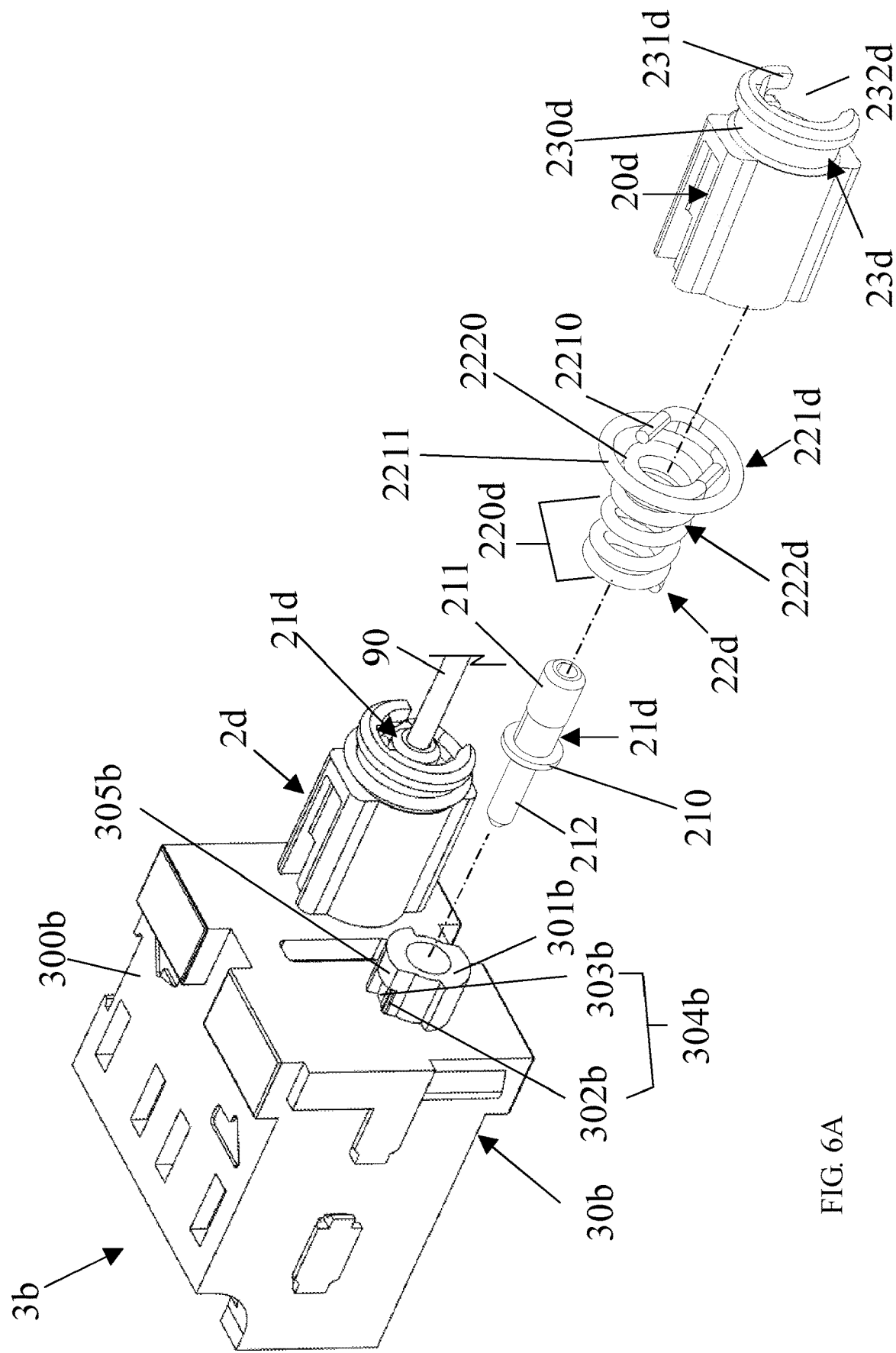
FIG. 6A is an exploded schematic diagram of another embodiment of the optical connector module of the present invention.
Figure 6D:
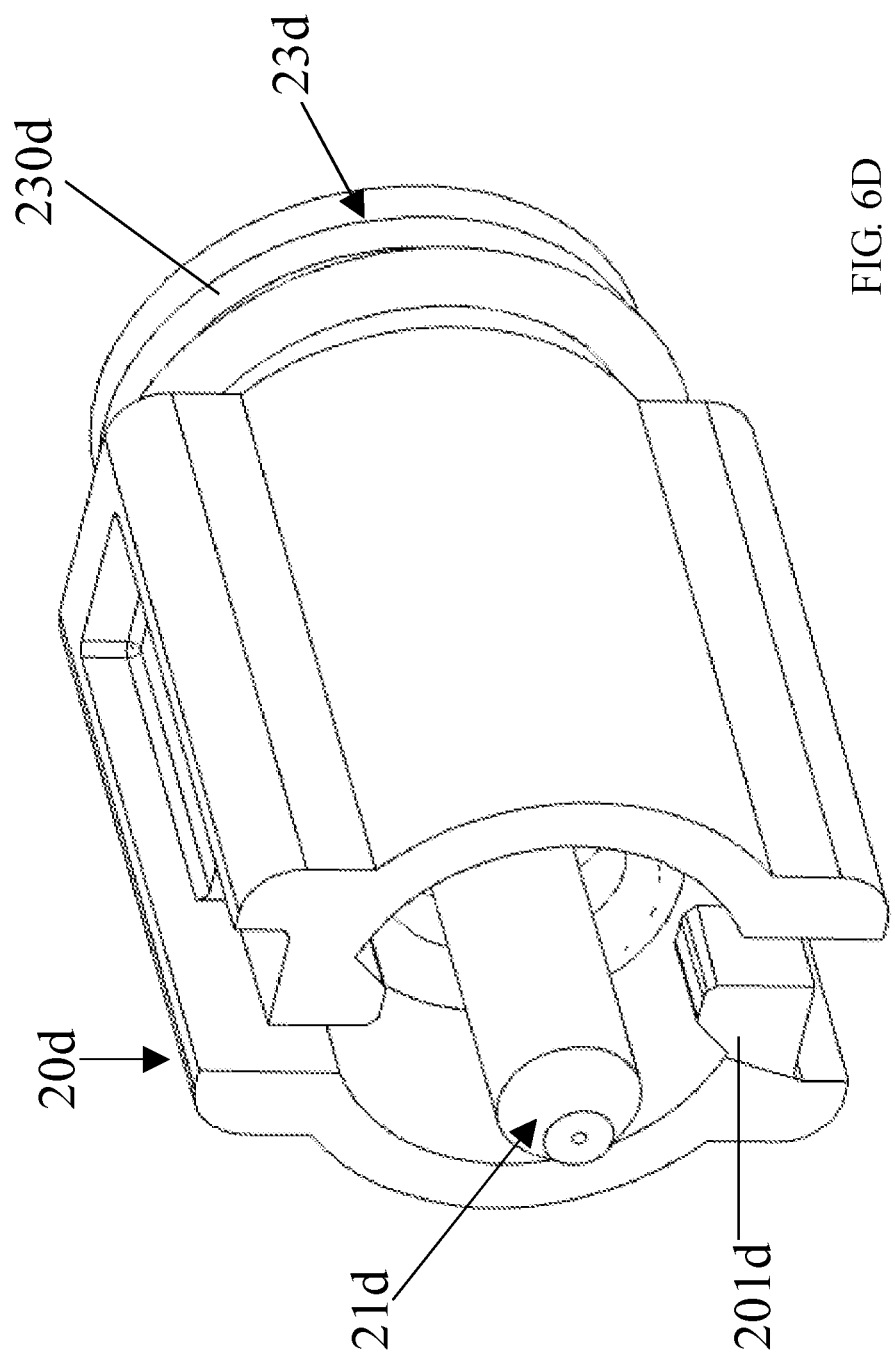
FIG. 6D is a three-dimensional schematic diagram of the optical connector from different viewing angles in the present invention.

Please refer to FIG. 6A to 6D, in which FIG. 6A is an exploded schematic diagram of another embodiment of the optical connector module, FIG. 6B is a three-dimensional schematic diagram of the optical connector of FIG. 6A from different viewing angles, FIG. 6C is a schematic partial cross-sectional view of the coupling position between the optical connector and the optical receptacle, and FIG. 6D is a three-dimensional schematic diagram of the optical connector from different viewing angles in the present invention. In this embodiment, the optical connector module 3b includes an optical receptacle 30b and an optical connector 2d. The optical receptacle 30b includes a receptacle body 300b and a plurality of coupling terminals 301b, which are respectively coupled to the optical connector 2d. Each coupling terminal 301b has a first buckle structure 304b, which includes a buckle convex portion 302b and a buckle concave portion 303b.

In this embodiment, the optical connector 2d includes a housing 20d, a coupling terminal 21d, and a coil structure 22d. The housing 20d has an accommodation space for accommodating the coupling terminal 21d and a part of the coil structure 22d. It is similar to the aforementioned housing 20c, and would not be repeated here. In this embodiment, a positioning structure 23d is disposed on an end of the housing 20d. In this embodiment, the positioning structure 23d further has an accommodation groove 230d and a leaning structure 231d, wherein the leaning structure 231d is disposed on the periphery of the accommodation groove 230d, and an opening 232d is disposed in a predetermined area of the leaning structure 231d. A positioning groove 233d is arranged on a side wall of the opening 232d.

The coupling terminal 21d is accommodated in the accommodation space of the housing 20d for coupling with one of the coupling terminals 301b on the optical receptacle 30b. The coil structure 22d has an elastic coil 220d, a first fixing coil 221d, and a second fixing coil 222d. The outer diameter of the second fixing coil 222d is equal to the outer diameter of the elastic coil 220d and smaller than the outer diameter of the first fixing coil 221d. The second fixing coil 222d further has an extending section 2220, which is extended to the opening 232d of the accommodation groove 230d, is connected to the winding section 2211 of the first fixing coil 221d, and is wound around the accommodation groove 230d. Another end of the winding section 2211 is connected to the end section 2210, and the end section 2210 extends toward the side wall of the opening 232d and is leaned against the positioning structure 23d. In this embodiment, the positioning structure 23d further has a positioning groove 233d formed on the accommodation groove 230d on a side of the opening 232d. Because the end section 2210 is bent in a predetermined angle by the first fixing coil 221d and leaned against the positioning groove 233d on the side wall of the opening 232d, the winding section 2211 and the end section 2210 are respectively clamped on the periphery of the first terminal portion 211 of the coupling terminal 21d to produce the effect of fixing the coupling terminal 21d. The first terminal portion 211 is used for coupling with fiber 90.

When assembling the coil structure 22d, an end of the elastic coil 220d is clamped against the stopping wall 210 of the coupling terminal 21d, and the entire coil structure 22d and the coupling terminal 21d are inserted into the accommodation space of the housing 20d. After that, the first fixing coil 221d is sleeved into the accommodation groove 230d of the positioning structure 23d, and the end section 2210 is slightly internally pressed and clamped on the positioning groove 233d of the leaning structure 231d. The positioning effect is produced by the force between the end section 2210 and the leaning structure 231d. After that, the optical connector 2d is coupled to the coupling terminal 301b of the optical receptacle 30b, and the second buckle structure 210d of the optical connector 2d is inserted into the first buckle groove 304 during coupling, so that the second terminal portion 212 of the coupling terminal 21d is coupled with the coupling terminal 301b of the optical receptacle 30b. Eventually, the housing 20d is rotated clockwise in a predetermined angle to make the second buckle structure 210d move into the buckle concave portion 303b. Since the second buckle structure 201d is a convex block, after being embedded in the buckle concave portion 303b, it would be blocked by the buckle convex portion 302b in the rotation direction (or radial direction), and would be blocked by the stopping block 305 in the axial direction, so that the optical connector 2d is avoided being separated from the optical connector receptacle 30b, and the optical connector 2d is fixed on the optical receptacle 30b. It should be noted that if it is to be separated, take FIG. 6C as an example, the housing 20d shall be rotated by an external force, so that the second buckle structure 201d is released from the buckle convex portion 302b. At this time, the second buckle structure 201d is also separated from the stopping block 305b in the axial direction, and the optical connector 2d may be taken away from the optical receptacle 30b.

Since the accommodation groove 230d and the leaning structure 231d restrain the first fixing coil 221d, it may be ensured that when the elastic coil 220d in the coil structure 22d is stretched and compressed along the central axis of the optical connector 2d, the coil structure 22d is not separated from the housing. In addition, since the second fixing coil 222d is extended from the first fixing coil 221d and arranged in the housing 20d, the periphery of the first terminal portion 211 of the coupling terminal 21d would be restrained by the second fixing coil 222d. The second fixing coil 222d does not have compression or stretching effect. Therefore, when the coupling terminal 21d is coupled with the optical receptacle 30b, the shift of the coil structure 22d due to the lateral or radial force may be avoided, the stability of coupling terminal 21d may be maintained, and the position of the coupling terminal 21d of the optical connector 2d may be stabilized to ensure the effect of signal connection.

It should be noted that the coil structure 22, 22a, 22b, 22c, 22d of the present invention is achieved through the positioning structure 23, 23a and 23b, 23c, 23d being integrally formed with the housing 20, 20a, 20b, 20c, 22d to achieve the effect of fixing the elastic coil, so that it's not necessary to additionally provide a supporting structure of the stopping coil. Therefore, the length of the housing 20, 20a, 20b, 20c, 20d may be shortened to achieve the effect of saving space.

In summary, through the arrangement of the elastic element in the optical connector of the present invention, one end of the elastic element may be axially positioned and the coupling terminal may be positioned radially. It may avoid the problem that the coupling terminal is shift due to the lateral force when inserted into the optical receptacle, and ensure that the elastic element may only be elastically compressed or stretched in the central axis, so as to ensure the position of the coupling terminal in the axial direction and the electrical connection between the coupling terminal and the optical receptacle.

It will be understood that the above description of embodiments is given by way of example only and that various modifications may be made by those with ordinary skill in the art. The above specification, examples, and data provide a complete description of the present invention and use of exemplary embodiments of the invention. Although various embodiments of the invention have been described above with a certain degree of particularity, or with reference to one or more individual embodiments, those with ordinary skill in the art could make numerous alterations or modifications to the disclosed embodiments without departing from the spirit or scope of this invention.

What is claimed is:
1. An optical connector, comprising:
   a housing, having a positioning structure, an accommodation space disposed into the housing;
   a coupling terminal, disposed into the accommodation space; and a coil structure, having an elastic coil and a first fixing coil, the elastic coil sleeved on the coupling terminal, and the first fixing coil sleeved on the positioning structure, wherein a second fixing coil is connected between the elastic coil and the first fixing coil, and is fixed with the coupling terminal.

2. The optical connector of claim 1, wherein outer diameter of the first fixing coil is larger than outer diameter of the elastic coil.

3. The optical connector of claim 1, wherein the positioning structure is disposed into the accommodation space, and has an accommodation groove and a plurality of leaning structures, the accommodation groove is disposed on a wall surface of the accommodation space, the plurality of leaning structures are connected to a wall surface of the housing and correspond to the accommodation groove, and the first fixing coil is disposed into the accommodation groove and restrained by the plurality of leaning structures.

4. The optical connector of claim 1, wherein outer diameter of the second fixing coil is equal to outer diameter of the elastic coil, and is smaller than outer diameter of the first fixing coil.

5. The optical connector of claim 1, wherein the positioning structure is disposed on an end of the housing, and has an accommodation groove and a leaning structure connected to a side of the accommodation groove, the first fixing coil is disposed into the accommodation groove, and an end section of the first fixing coil is leaned against the positioning structure.

6. The optical connector of claim 1, wherein outer diameter of the second fixing coil is equal to outer diameter of the elastic coil, and is smaller than outer diameter of the first fixing coil.

7. The optical connector of claim 5, wherein the accommodation groove has an opening, a positioning groove is disposed on a side of the opening.

8. The optical connector of claim 7, wherein the first fixing coil has an extending section and at least one winding section, the extending section extends from the accommodation space to the opening of the accommodation groove, an end of the at least one winding section is connected to the extending section, another end of the at least one winding section is connected to the end section, and the at least one winding section is wound on the accommodation groove, the end section extends toward the positioning structure and is leaned against the positioning groove.

* * * * *